Dec. 25, 1951 J. L. RAY 2,579,614
COMBUSTION CHAMBER WITH ROTATING FUEL AND AIR
STREAM SURROUNDING A FLAME CORE
Filed June 23, 1944

Inventor
James L. Ray
by K. A. Wyman
Attorney

Patented Dec. 25, 1951

2,579,614

UNITED STATES PATENT OFFICE 2,579,614

COMBUSTION CHAMBER WITH ROTATING FUEL AND AIR STREAM SURROUNDING A FLAME CORE

James L. Ray, Elm Grove, Wis., assignor to Allis-Chalmers Manufacturing Company, Milwaukee, Wis., a corporation of Delaware Application June 23, 1944, Serial No. 541,695

5 Claims. (Cl. 60—39.65)

This invention relates to fluid fuel burning apparatus particularly adapted for use in motive fluid generating and confining conduits of the type commonly employed in continuous combustion gas turbine systems and has for its object the complete combusting of large quantities of fuel in a relatively small space without damage to the flame confining structure and with improved results as to both flame stability and combustion efficiency.

In accordance with this invention, the above stated object may be accomplished by combining the primary fuel and air streams in a novel manner, that is by establishing a confined and rapidly rotating cylindrical body of air moving in a longitudinal direction with reference to its axis of rotation and spraying primary fuel into the initially formed, central portion of the rotating body of air whereby the inner peripheral surface of the confining structure is continuously swept by a rotating body of protecting air and/or gas.

The construction and operation of apparatus embodying the invention will become apparent as the disclosure progresses and particularly points out additional features which are considered of special importance and of general application although illustrated and described as applied to a motive fluid generating apparatus for gas turbine systems.

Accordingly, the invention may be considered as consisting of the various correlations of features, combinations of elements, and arrangements of parts as is more fully set forth in the appended claims and in the detailed description, in which:

Figure 1:
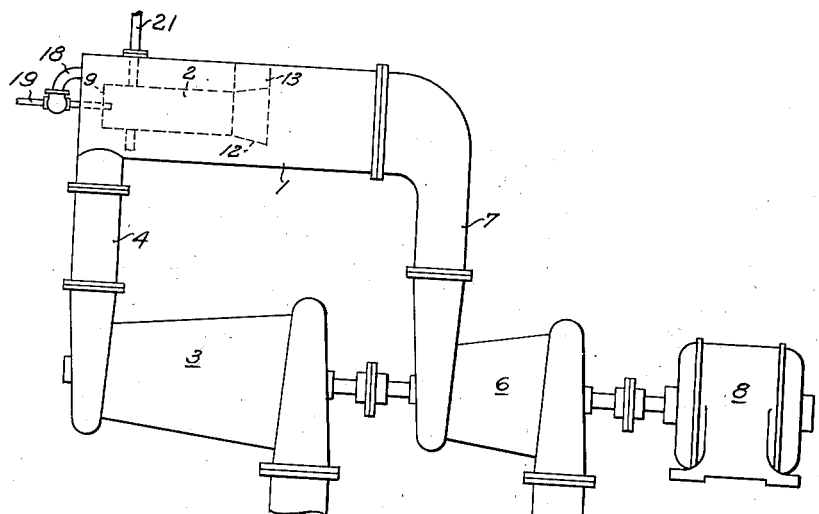
Fig. 1 is a schematic diagram of a continuous combustion gas turbine system embodying the invention.

Referring to Fig. 1 of the drawing, it is seen that the invention may be applied to apparatus comprising a motive fluid generating and confining conductor or shell structure 1 embodying a combustion chamber 2 and having an inlet portion connected with the discharge of a compressor 3 by means of a conduit 4 and a discharge portion connected with the inlet of a turbine 6 by means of a conduit 7; the turbine 6 being drivingly connected with the compressor 3 and with a dynamo electric machine 8 operable in the usual manner either as a generator to convert excess power developed by the turbine into electrical energy or as a motor for use in initiating operation of the system.

Figure 2:
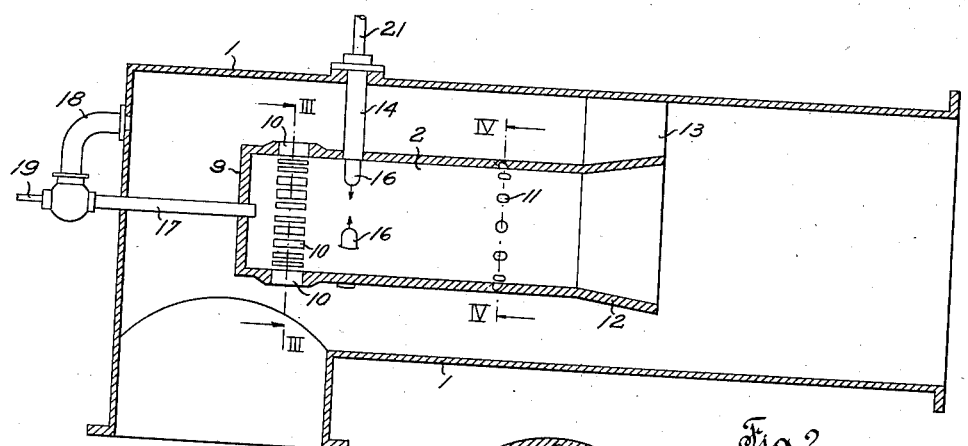
Fig. 2 is a vertical, longitudinal section through the motive fluid generating portion of Fig. 1.
Figures 3, 4:
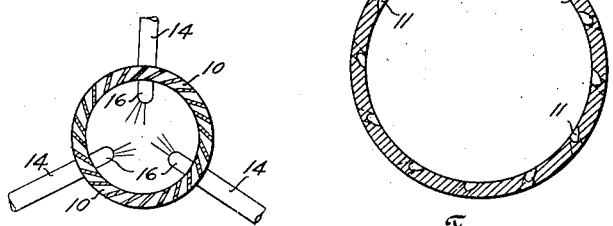
Fig. 3 is a section taken on line III—III of Fig. 2.
Fig. 4 is a section taken on line IV—IV of Fig. 2.

Referring also to Fig. 2 it is seen that the combustion chamber 2, which is of generally cylindrical shape, is disposed in spaced, coaxial relation mostly or entirely within the inlet portion of shell structure 1 and has a closed inlet end 9, a first circumferential series of tangentially directed air admission openings 10 adjacent its closed inlet end (see Fig. 3), a second circumferential series of air admission openings 11 directed both tangentially and rearwardly (see Fig. 4), and a flaring discharge portion 12. The combustion chamber is preferably supported in the coaxial relation specified by any suitable means such as one or more struts or vanes 13 and a plurality of primary fuel conducting pipes 14. Pipes 14 extend radially inward through the shell structure 1 and terminate within the combustion chamber 2 in nozzle portions 16 disposed in downstream adjacent relation to the air admission openings 10 and in upstream remote relation with respect to the openings 11; said nozzles project a considerable distance into the chamber 2 and each has one or more orifices arranged to direct primary fuel sprays tangentially into the central portion of the body of air confined within the combustion chamber as indicated in Fig. 3. Combustion chamber 2 may also be partially supported by means of a pilot fuel supply pipe or burner 17 which extends coaxially through the adjacent end of shell structure 1 and through the closed end 9 of combustion chamber 2 with its discharge end or nozzle terminating intermediate the inlet end 9 and the series of air admission openings 10.

Air for producing a combustible mixture in burner 17 may be obtained from the interior of shell structure 1 by means of a conduit 18. Pilot burner 17 receives its fuel from any suitable source (not shown) through a pipe 19 and the primary fuel pipes or burners 14 receive their fuel from any suitable source (not shown) through a pipe or pipes 21, which source, if desired, may be the same as that provided for pilot burner 17. However, it is preferable to supply the pilot burner with a gaseous fuel and the primary burners with a liquid or a pulverant fuel or both.

In operation, air discharge from compressor 3 passes through conduit 4 into the inlet end of shell structure 1 wherein it is initially divided into two streams, an outer cooling stream the major portion of which passes around combustion chamber 2 and mixes with the combustion products issuing from the flaring discharge end thereof and an inner stream which enters combustion chamber 2 through the openings 10 and forms therein a rapidly rotating, generally cylindrical body of air which moves axially therethrough and out the flaring discharge end thereof. Primary fuel is directed tangentially into the central portion of the rotating body of air by means of the nozzle portions of pipes 14 to form within the combustion chamber adjacent the openings 10 a fuel-air mixture core surrounded by a layer of air and the combustible mixture core thus formed is ignited by the axially directed flame issuing from pilot burner 17. The layer of air surrounding the fuel-air mixture core acts to confine the flame within the central portion of the combustion chamber and thereby prevent the flame from contacting and burning-out the combustion chamber wall. In this connection, the additional air entering the peripheral portion of the combustion chamber through the openings 11 acts to form a flame-confining and wall-protecting air layer supplementing the protective air layer initially formed adjacent the closed end of the combustion chamber by the correlation of the air openings 10 and the nozzle portions of primary fuel pipes 14. The non-combustible motive fluid, that is, the mixture of combusted gas and cooling air formed in adjacent downstream relation to the open end of the combustion chamber, flows from shell structure 1 through conduit 7 and into the turbine 6 which drives the compressor 3 and generator 8.

In accordance with this invention, the introduction of primary fuel into the initially formed central portion of a confined, rapidly rotating, generally cylindrical body of air, which moves axially through the confining structure toward the discharge end thereof, quickly and thoroughly mixes the fuel with the central portion of the air to form a fuel-air mixture core surrounded by a wall-protecting air layer and enables the resulting core of mixture to be readily ignited and completely and harmlessly burned in a confining structure of short length measured in the axial direction of mixture movement either with or without the aid of additional air openings corresponding to those designated 11. Consequently, the confining structure, the combustion chamber 2 in this case, may be made of short axial length and since the products issuing from the discharge end thereof are completely combusted, the axial length of the shell structure 1 may also be decreased without danger of delivering partially combusted material to the prime mover.

The construction and operation of the apparatus herein disclosed is of general application to fluid fuel burners although of particular advantage in connection with the formation of large quantities of high temperature non-combustible motive fluids suitable for use in the gas turbine type of prime mover and it should therefore be understood that it is not desired to limit the invention to the exact details of construction and operation herein shown and described as various modifications within the scope of the appended claims may occur to persons skilled in the art.

It is claimed and desired to secure by Letters Patent:

1. A fluid fuel burning device comprising a combustion chamber closed at one end and having a series of openings arranged about the periphery of the chamber and forming air inlet passages inclined to direct air tangentially into the chamber for causing the air filling the chamber to rotate about the axis and to move axially of the chamber, a plurality of nozzles extending into the chamber radially thereof and downstream from the air inlets for supplying fuel to and causing a mixing of fuel with the air in the core portion of the air in the chamber, and means for igniting the air-fuel mixture in the chamber.

2. A fluid fuel burning device comprising a combustion chamber closed at one end and having a series of openings arranged about the periphery of the chamber and forming air inlet passages inclined to direct air tangentially into the chamber for causing the air filling the chamber to rotate about the axis and to move axially of the chamber, a plurality of nozzles extending radially of and for a substantial distance into the chamber and downstream of the air inlets thereinto for supplying fuel to and causing a mixing of fuel with the air in the core portion of the air in the chamber, and means for igniting the air-fuel mixture in the chamber.

3. A fluid fuel burning device comprising a combustion chamber closed at one end and open at the other end, the chamber having a first series of openings arranged about the periphery of the chamber and forming air inlet passages inclined to direct air tangentially into the chamber for causing the air filling the chamber to rotate about the axis and to move axially of the chamber and having a second series of openings arranged peripherally about the chamber and forming air inlet passages extending tangentially of and toward the open end of the chamber, a plurality of nozzles extending into the chamber radially thereof and intermediate said first and second series of air inlets for supplying fuel to and causing a mixing of fuel with the air in the core portion of the air filling the chamber, the second series of openings increasing the rotation and the axial movement of the layer of air, and means for igniting the air-fuel mixture in the chamber.

4. A fluid fuel burning device comprising a combustion chamber closed at one end and open at the other end, the chamber having a first series of openings arranged about the periphery of the chamber and forming air inlet passages inclined to direct air tangentially into the chamber for causing the air filling the chamber to rotate about the axis and to move axially of the chamber and having a second series of openings arranged about the periphery of the chamber and forming air inlet passages inclined to direct air tangentially into and toward the open end of the chamber, a plurality of fuel supply nozzles extending into the chamber radially between the two series of openings thereinto and for a substantial distance from the interior wall surface of the chamber and in substantially the same plane for causing a mixing of fuel with substantially only the air in the core portion of the air between the nozzle ends in the chamber, and means for igniting the air-fuel mixture in the chamber.

5. A fluid fuel burning device comprising a combustion chamber closed at one end and having a series of openings arranged about the periphery of the chamber and forming air inlet passages inclined to direct air tangentially into the chamber for causing the air filling the chamber to rotate about the axis and to move axially of the chamber, a plurality of nozzles extending into the chamber radially thereof and downstream from the air inlets for supplying fuel to and causing a mixing of fuel with the air in the core portion of the air in the chamber, means for igniting the air-fuel mixture in the chamber, and a conduit in spaced relation about the chamber for guiding the air flowing thereto and for providing an annular flow of air about at least the combustion zone of the chamber and in the direction of the axial movement of the air therein.

JAMES L. RAY.

REFERENCES CITED

The following references are of record in the file of this patent:

UNITED STATES PATENTS

| Number | Name | Date |
|---|---|---|
| 1,273,466 | Doble | July 23, 1918 |
| 1,428,574 | Woolley | Sept. 12, 1922 |
| 1,910,735 | Zekesch | May 23, 1933 |
| 2,097,255 | Saha | Oct. 26, 1937 |
| 2,110,209 | Engels | Mar. 8, 1938 |
| 2,268,464 | Seippel | Dec. 30, 1941 |
| 2,340,120 | Grapp | Jan. 25, 1944 |
| 2,353,929 | Ray | July 18, 1944 |
| 2,398,654 | Lubbock et al. | Apr. 16, 1946 |
| 2,404,335 | Whittle | July 16, 1946 |

FOREIGN PATENTS

| Number | Country | Date |
|---|---|---|
| 539,069 | Great Britain | Aug. 27, 1941 |